United States Patent
Benson

(10) Patent No.: US 12,257,959 B2
(45) Date of Patent: Mar. 25, 2025

(54) UTV HEAT SHIELD INSTALLATION

(71) Applicant: Zachary Benson, Siren, WI (US)

(72) Inventor: Zachary Benson, Siren, WI (US)

( * ) Notice: Subject to any disclaimer, the term of this patent is extended or adjusted under 35 U.S.C. 154(b) by 294 days.

(21) Appl. No.: 17/962,943

(22) Filed: Oct. 10, 2022

(65) Prior Publication Data

US 2024/0116462 A1     Apr. 11, 2024

(51) Int. Cl.
B60R 13/08     (2006.01)

(52) U.S. Cl.
CPC ............... *B60R 13/0838* (2013.01)

(58) Field of Classification Search
CPC ..................................... B60R 13/0838
USPC ................................... 428/34.1
See application file for complete search history.

(56) References Cited

U.S. PATENT DOCUMENTS

| | | | |
|---|---|---|---|
| 4,849,273 | A | 7/1989 | Skinner et al. |
| 5,385,790 | A | 1/1995 | Atkinson et al. |
| 6,933,035 | B1 | 8/2005 | Wickstrom et al. |
| 6,959,855 | B2 | 11/2005 | Bridgeman et al. |
| 7,446,065 | B2 | 11/2008 | Wenstrup et al. |
| 7,556,292 | B2 | 7/2009 | King |
| 2002/0031969 | A1 | 3/2002 | Bridgeman et al. |
| 2004/0021352 | A1 | 2/2004 | Montone |
| 2009/0021051 | A1* | 1/2009 | Brown ............... B60J 1/20 296/201 |
| 2016/0185406 | A1* | 6/2016 | Tsumiyama ......... B60P 1/28 298/17 R |
| 2017/0013807 | A1* | 1/2017 | Johnson ............. A01K 27/003 |
| 2023/0110359 | A1* | 4/2023 | Huang ............... C30B 15/203 117/15 |
| 2023/0202278 | A1* | 6/2023 | Berrios Salas ....... B60J 11/04 150/166 |

OTHER PUBLICATIONS

RZR Behind Seat Heat Control Kit, Design Engineering, (https://www.amazon.com/Design-Engineering-902403-Complete-Control/dp/B099THVRRM/) (Year: 2021).*
RZR Behind The Seat Heat Shield and UTV Cool Cab Kit (Wolfsnout)—https://wolfsnout.net/product/rzr-behind-the-seat-heat-shield-and-utv-cool-cab-kit/ (Accessed Oct. 10, 2022).

* cited by examiner

*Primary Examiner* — Yi-Kai Wang
(74) *Attorney, Agent, or Firm* — Westman, Champlin & Koehler, P.A.; Amanda M. Prose

(57) ABSTRACT

A UTV heat shield assembly having a first side comprising a heat-resistant material and a second side comprising a canvas material, the heat shield being pliable and having a base, rear wall and two opposing side walls such that the heat shield has dimensions configured to receive a seat bottom of a UTV thereon and fit over an opening to an engine bay of the UTV. The rear wall blocks a gap between the seat bottom and a seat back of the UTV and the two opposing side walls block gaps on sides of the seat bottom while the base covers the opening to the engine bay such that when installed the heat shield substantially seals the engine bay off preventing a flow of hot air from the engine bay into a seating area of the UTV.

11 Claims, 3 Drawing Sheets

UTV HEAT SHIELD INSTALLATION

BACKGROUND

The present invention relates to an after-market heat shield installation for a vehicle and more specifically to a heat shield for installation below a seat in a cab of a utility terrain vehicle.

In many UTVs an engine bay is provided beneath the seat of the UTV. Heat from the engine can enter the cab through the seat and surfaces around the seat and the seat itself can become hot to the touch. Heat leaks into the cab contributing to overheating inside the cab, especially when the UTV is used in warm weather.

SUMMARY

An aspect of the present disclosure relates to a heat shield for installation on a seat frame in a UTV between a seat bottom and an engine bay of the UTV, the heat shield comprising a base surface and a rear wall wherein the base surface is configured to fit below the seat frame and wherein the rear wall seals a gap between the seat bottom and a seat back installed on the seat frame and wherein a surface of the heat shield facing the engine bay comprises a first material that is a heat resistant material.

An opposing surface of the heat shield and facing the seat bottom and seat from is comprised of a second material that is different from the first material.

The second material is a flexible, plain woven, water resistant material.

The heat shield also has two opposing side wall lengths on terminal ends of the base wherein the base has a length and a depth corresponding to a length and a depth of the seat bottom such that the heat shield is configured for installation below the seat bottom and wherein the opposing side wall lengths are installed on opposing ends of the seat bottom.

One or more fastening mechanisms are provided thereon for removably securing the heat shield between the seat bottom and engine bay of the UTV.

The fastening mechanisms comprise one or more strips of hook and loop fastener, apertures for receiving pins or tacks for connecting to grommets in the seat frame, and combinations thereof.

Another aspect of the present disclosure relates to a method of sealing an engine bay of a UTV to prevent hot air flow from the engine bay through one or more gaps in a seat assembly there above, the method comprising installing a base of a heat shield below a seat bottom in the seat assembly and between the seat assembly and engine bay and installing a back wall of the heat shield between a first gap in the seat assembly formed between the seat bottom and a seat back such that the back wall of the heat shield substantially blocks the first gap. The heat shield comprises a heat-resistant material facing the engine bay.

Installing two opposing side walls of the heat shield between two opposing second gaps on opposing sides of the seat bottom further seals the engine bay.

Securing the heat shield to the seat assembly above the engine bay and sealing the engine bay with respect thereto comprises one or more hook and loop fasteners systems for securing the heat shield to the seat assembly to prevent slipping or movement of the installed heat shield below the seat bottom or along the first gap.

Another aspect of the present disclosure relates to a heat shield assembly for a UTV comprising a heat shield having a first side comprising a heat-resistant material and a second side comprising a canvas material, the heat shield being pliable and having a base, rear wall and two opposing side walls such that the heat shield has dimensions configured to receive a seat bottom of a UTV thereon and fit over an opening to an engine bay of the UTV. The rear wall blocks a gap between the seat bottom and a seat back of the UTV and the two opposing side walls block gaps on sides of the seat bottom while the base covers the opening to the engine bay such that when installed the heat shield substantially seals the engine bay off preventing a flow of hot air from the engine bay into a seating area of the UTV.

The heat-resistant material comprises a carbon felt material.

The two opposing side walls are tapered side walls.

The heat shield further comprises one or more holes for receiving a fastener to couple with one or more grommets on the UTV for securing the heat shield thereto.

DETAILED DESCRIPTION

Figure 1:
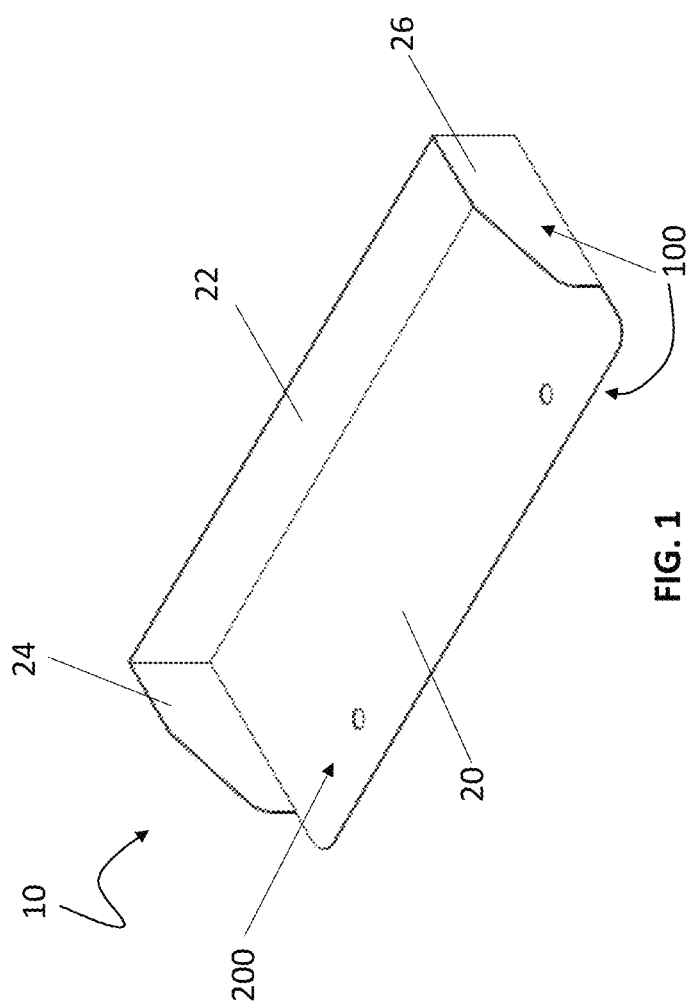
FIG. 1 is a front perspective view of a heat shield installation according to one or more embodiments described herein.

A heat shield is described herein and is installed in a manner that forms a seal between a heat source and a cab of a UTV thus preventing and/or substantially eliminating the flow of hot air from the heat source into the cab. The heat shield does not act to deflect radiant heat but instead to seal a connection between a passenger area of the vehicle and the engine bay of the vehicle, thus preventing hot air flow into the passenger area. The heat shield is a customizable aftermarket installation for a UTV.

The heat shield assembly may be provided in various shapes and dimensions such that the heat shield installation can be utilized in any model UTV or other off road or all-terrain vehicle having a heat source below the seat. The heat shield assembly may also be tailored for additional locations in a UTV or other vehicle such as near pedals, steering columns, or other cab locations and may act as an insulator as well as a sound damping device.

In one embodiment the heat shield is installed below the seat of a UTV where the engine bay is positioned beneath the seat. The heat shield has dimensions sufficient to allow the heat shield to sit below the beat bottom and extend upwardly to cover a cap between the seat bottom and the seat back. The heat shield may be a substantially fabric construction and without any separate frame for providing structure and shape to the heat shield. For example, the heath shield described herein comprises a heat-resistant material such as a heat resistant fabric. The heat-resistant fabric may be a carbon felt material or "welding blanket." The heat-resistant material is installed facing the heat source of the vehicle and below the seat, for example.

A rear face of the material may then have a second material adhered thereto for protecting the heat-resistant material during installation and/or for providing support to the heat resistant-material. The second material may be a flexible, water resistant, durable, easily cleanable fabric, plain woven or non-woven fabric, non-limiting examples of which include canvas, duck cloth, nylon, vinyl, and/or blends thereof. The second material may be adhered to the back side of the heat-resistant material by various means including an adhesive layer therebetween, sewing, bonding, mechanical fastening with rivets or other fasteners, or combinations thereof.

The heat shield may be a pliable but stiff assembly able to retain its shape without a frame or other support elements. The heat shield may also be configured for removable installation allowing the use of the heat shield only when desired.

The heat shield may also be provided on one or both sides with one or more hook and loop fastener strips (Velcro®) and the strips may be positioned on one or more edges and/or front lengths of the heat shield to ensure taught installation and to prevent sliding or bunching up of the heat shield in use, for example, when removing/installing the seat bottom and/or back and for securing the heat shield over any apertures or holes in the frame for the seat where grommets or other hardware may be removed for heat shield installation.

A heat shield 10 according to one or more embodiments herein may be a multi-layer construction of a first layer 100 and second layer 200 as shown in FIG. 1. The first layer 100 is a heat resistant material and the second layer 200 is a different fabric material. One or both layers may have one or more installation mechanisms 300 secured thereto and configured for securing the heat shield during installation. The installation mechanisms 300 may comprise hook and loop fastener strips, apertures for fasteners and combinations thereof.

Figure 2:
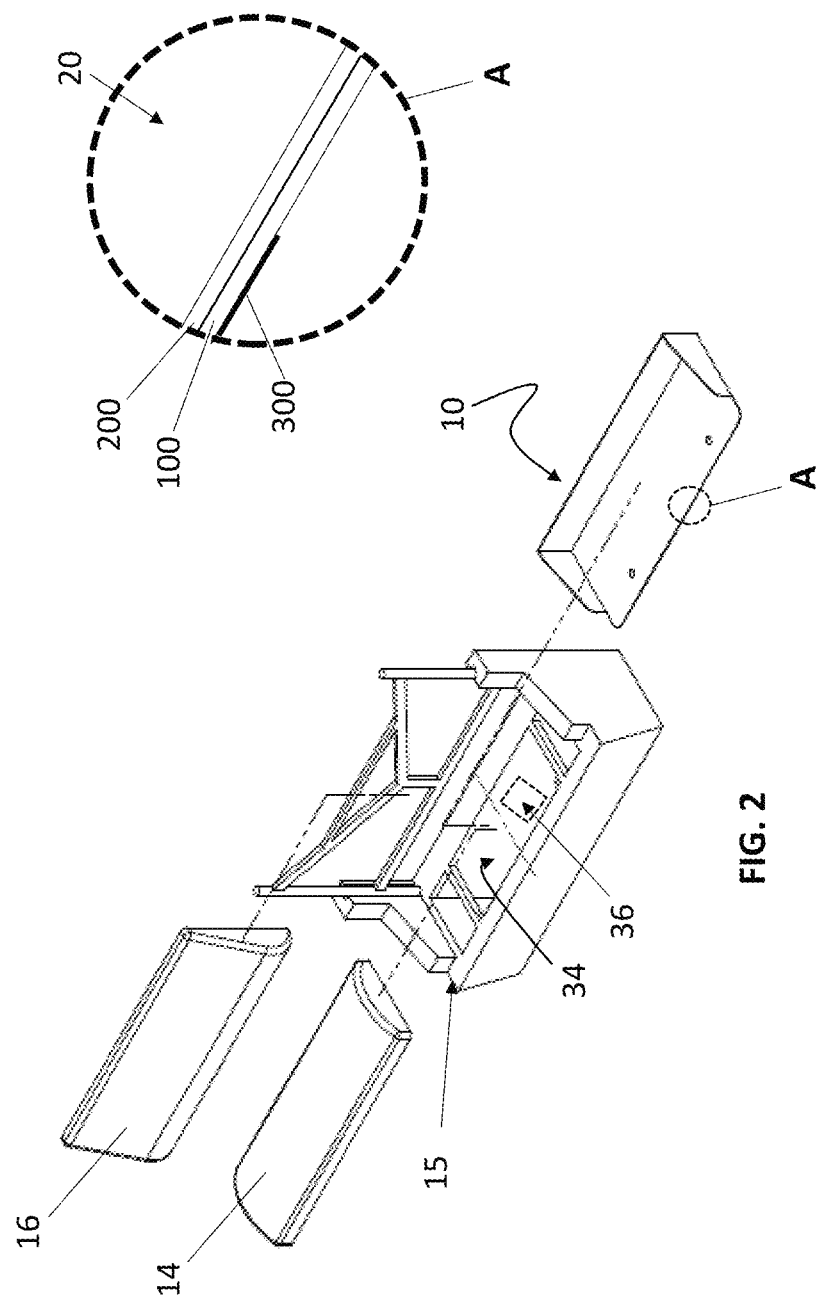
FIG. 2 illustrates an installation of the heat shield below a seat of a vehicle.
Figure 3:
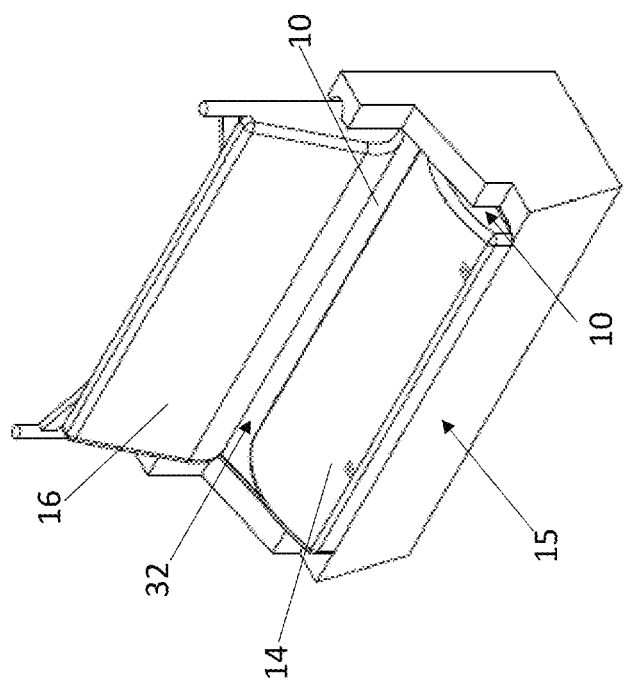
FIG. 3 is a seat with the heat shield installed.

The heat shield 10 may then be formed for installation and having dimensions which allow the installation in a selected location on the UTV such that the heat-resistant material 100 is facing the heat source 34. As illustrated in FIG. 2-3, for example, the heat-shield 10 may be configured to fit on a seat frame 12 below a seat bottom 14 of a UTV. The heat shield 10 has a first base surface 20, a rear wall 22, and two opposing tapered side walls 24, 26 which extend at least partially along a depth 28 of the base 20 surface. The dimensions of the heat shield 10 may then substantially match the dimensions (e.g., length and depth) of the UTV seat frame 15 such that the base 20 of the heat shield sits below the seat bottom 14 and the rear wall 22 extends upwardly to block a gap 32 between the installed seat bottom 14 and seat back 16. The opposing side walls 24, 26 also fit and block any gap on the sides of the seat frame 15.

When the heatshield is installed 10, one or grommets may then be positioned and/or installed for securing the heat shield 10 in a manner where vehicle seat belts can be removed and remounted over the top of the heat shield 10. The grommets may be added in the location of the seat belt mounting bolts to secure the heat shield in a more permanent fashion. Additional openings may then be provided in the heat shield 10 for seat pins and/or for otherwise flush installation of the heat shield on the seat frame. The additional openings may be made in the heat shield 10 to allow seat pins to pass through to the grommets below.

As shown in FIG. 3, in installation, the heat shield 10 may be installed behind the seat buckles of the seat of the UTV and in such a manner that the heat shield 10 covers the gap 32 between the seat bottom 14 and back 16 and thus forms a heat-resistant barrier and a seal between the gap 32 in back of the seat and the cab. The second material 200 of the heat shield 10 is then exposed in this gap and as that second material 200 may be a canvas material or other durable, water resistant fabric material, the heat shield 10 is protected from damage from objects in the cab or on the seats. Trim screws and/or tacks may also be used to ensure the heat shield 10 is installed in a manner that is taught and a "tight fit" against the back 16 of the seat and along the seat bottom 14.

Installing the heat shield on a UTV according to one or more embodiments herein, prevents heat leaking from the engine bay 36 and entering the cab. The heat shield may also be installed around the vehicle steering wheel, pedals and other front facing components of the UTV. The dimensions of the heat shield may then be tailored accordingly for a snug and exact fit.

The heat-shield may be an aftermarket installation for a UTV. The heat shield may also be removable. For example, when needing to access the engine bay or other components below the seat, the heat shield is removeable as the heat shield is installed and secured by Velcro®.

The heat shield described herein also serves to reduce and dampens sound levels in the cab as relates to the noise generated by the engine below the seat.

The heat shield according to one or more embodiments herein may provide a custom fit to seal the cab from hot air entering from the engine bay. That is, the seat becomes sealed, and the cab is sealed with respect to preventing hot air from entering from the engine bay. The heat shield is non-traditional in that the heat shield described herein does not reflect the radiant heat from the engine bay but instead creates a seal between the cab and the engine bay to substantially prevent flow of heat and air between the engine bay and the cab.

In further detail, the heat-resistant material may be constructed from oxidized PAN fibers which do not burn, melt, soften or drip. A sheet of these fibers may be provided and cut to the specific dimensions required for the specific UTV. The heat-resistant material may be provided in a web with a weight of about 470 g/m$^2$ and a thickness according to DIN EN ISO 5084 with a continuous temperature resistance up to 200° C. or more.

Although the present disclosure has been described with reference to preferred embodiments, workers skilled in the art will recognize that changes may be made in form and detail without departing from the spirit and scope of the disclosure.

The invention claimed is:

1. A heat shield for installation on a seat frame in a UTV between a seat bottom and an engine bay of the UTV, the heat shield comprising a base surface and a rear wall wherein the base surface is configured to fit between the seat bottom and the seat frame, wherein the rear wall seals a gap between the seat bottom and a seat back installed on the seat frame and wherein a surface of the heat shield facing the engine bay comprises a first material that is a heat resistant material,
   wherein the heat shield further comprises two opposing side wall lengths on terminal ends of the base wherein the base has a length and a depth corresponding to a length and a depth of the seat bottom, and wherein the opposing side wall lengths are installed on opposing ends of the seat bottom.

2. The heat shield of claim 1 wherein an opposing surface of the heat shield facing the seat bottom comprises a second material that is different from the first material.

3. The heat shield of claim 2 wherein the second material is a flexible, plain woven, water resistant material.

4. The heat shield of claim 1 and further comprising one or more fastening mechanisms thereon for removably securing the heat shield between the seat bottom and seat frame of the UTV.

5. The heat shield of claim 4 wherein the fastening mechanisms comprise one or more strips of hook and loop fastener, apertures for receiving pins or tacks for connecting to grommets in the seat frame, and combinations thereof.

6. A method of sealing an engine bay of a UTV to prevent hot air flow from the engine bay through one or more gaps in a seat assembly there above, the method comprising:
  installing a base of a heat shield between a seat bottom and a seat frame in the seat assembly and between the seat assembly and engine bay;
    installing a back wall of the heat shield between a first gap in the seat assembly formed between the seat bottom and a seat back such that the back wall of the heat shield substantially blocks the first gap; and
    installing two opposing side walls of the heat shield between two opposing second gaps on opposing sides of the seat bottom,
  wherein the heat shield comprises a heat-resistant material facing the engine bay.

7. The method of claim 6 and further comprising securing the heat shield to the seat assembly above the engine bay and sealing the engine bay with respect thereto wherein one or more hook and loop fasteners systems are used to secure the heat shield to the seat assembly to prevent slipping or movement of the installed heat shield below the seat bottom or along the first gap.

8. A heat shield assembly for a UTV comprising:
  a heat shield having a first side comprising a heat-resistant material and a second side comprising a canvas material, the heat shield being pliable and having a base, rear wall and two opposing side walls such that the heat shield has dimensions configured to receive a seat bottom of a UTV thereon and fit over a seat frame of the UTV, and
  wherein the rear wall blocks a gap between the seat bottom and a seat back of the UTV and the two opposing side walls block gaps on sides of the seat bottom while the base covers the seat frame such that when installed the heat shield substantially seals the engine bay off preventing a flow of hot air from the engine bay into a seating area of the UTV.

9. The heat shield assembly of claim 8 wherein the heat-resistant material comprises a carbon felt material.

10. The heat shield assembly of claim 8 wherein the two opposing side walls are tapered side walls.

11. The heat shield assembly of claim 8 wherein the heat shield further comprises one or more holes for receiving a fastener to couple with one or more grommets on the UTV for securing the heat shield thereto.

\* \* \* \* \*